United States Patent [19]
Hamlin

[11] Patent Number: 4,706,575
[45] Date of Patent: Nov. 17, 1987

[54] SWIVEL MOUNT SUPPORT APPARATUS

[76] Inventor: Jerry J. Hamlin, 2356 N. 64th St., Mesa, Ariz. 85205

[21] Appl. No.: 9,016

[22] Filed: Jan. 30, 1987

Related U.S. Application Data

[63] Continuation of Ser. No. 700,396, Feb. 11, 1985, abandoned, which is a continuation of Ser. No. 350,625, Feb. 19, 1982, abandoned.

[51] Int. Cl.$^4$ .............................................. A47B 13/08
[52] U.S. Cl. .................................. 108/102; 108/137; 248/240; 248/281.1; 248/282; 297/240
[58] Field of Search .................. 108/131, 93, 102, 26, 108/137; 248/424, 280.1, 240, 240.1, 282, 289.1, 281.1; 297/344, 240

[56] References Cited

U.S. PATENT DOCUMENTS

| | | | |
|---|---|---|---|
| 1,146,849 | 7/1915 | Cornwell | 297/240 |
| 1,396,548 | 11/1921 | Bartlett | 248/282 |
| 1,910,091 | 5/1933 | Collier | 248/282 |
| 1,978,476 | 10/1934 | Reineke | 108/102 |
| 2,244,459 | 6/1941 | Jett et al. | 108/93 |
| 2,256,009 | 9/1941 | Atwood | 248/424 |
| 2,678,086 | 5/1954 | Mohr | 297/240 |
| 2,856,816 | 10/1958 | Ross | 248/281.1 |
| 3,748,409 | 7/1973 | Stokes | 248/289.1 |

FOREIGN PATENT DOCUMENTS 35323  7/1922  Norway .............................. 108/26

*Primary Examiner*—Kenneth J. Dorner
*Assistant Examiner*—Thomas A. Rendos
*Attorney, Agent, or Firm*—Harry M. Weiss & Associates

[57] ABSTRACT

A swivel mount support apparatus for supporting a power tool or the like comprising a base plate which may be secured to a workbench or a wall in the vicinity of a work area and a support plate on which the tool may be secured. First and second elongated generally S-shaped members are pivotably coupled to both the base plate and the support plate such that the support plate carrying the tool may be pivoted about the base plate in order to position the tool in an out-of-the-way location for storage or to a convenient work location for use.

5 Claims, 6 Drawing Figures

SWIVEL MOUNT SUPPORT APPARATUS

This application is a continuation of application Ser. No. 700,396, filed Feb. 11, 1985, now abandoned, which is a continuation of application Ser. No. 350,625 filed Feb. 19, 1982, now abandoned.

BACKGROUND OF THE INVENTION

This invention relates generally to support apparatus and, more particularly, to a swivel mount support apparatus which may be coupled to a wall or workbench for supporting power tools and the like.

It is not uncommon for machinists, handymen, or even the nonprofessional do-it-yourself enthusiast to accumulate a large number of both manual and power tools. Unfortunately, work areas such as workbenches and the like provide for only very limited storage areas. As a result, such work areas often become cluttered with tools and work materials which may hinder the work to be done, and which may possibly result in injury. Furthermore, tools and equipment such as bench vices and grinders are generally semi-permanently fixed to a workbench and, as a result, may be in the way when not being employed.

SUMMARY OF THE INVENTION

It is an object of the present invention to provide a swivel mount support apparatus for supporting a tool such as a bench grinder or the like in a manner that will allow the grinder to be positioned in a convenient location when needed and to be moved aside in an out-of-the-way location when not being used.

It is a further object of the present invention to provide an inventive swivel mount support apparatus which is simple in construction and adapted for coupling to either a workbench or a wall in or adjacent to a work area.

According to one embodiment of the invention, there is provided a swivel mount support apparatus for supporting a power tool or the like having a base plate which may be secured to a workbench or a wall in the vicinity of a work area and a support plate on which the tool may be secured. First and second elongated generally S-shaped members are pivotably coupled to both the base plate and the support plate such that the support plate carrying the tool may be pivoted about the base plate in order to position the tool in an out-of-the-way location for storage or to a convenient work location for use.

BRIEF DESCRIPTION OF THE DRAWING

The above and other objects, features and advantages of the present invention will be more clearly understood from the following detailed description taken in conjunction with the appended claims and the accompanying drawings, in which:

DESCRIPTION OF THE PREFERRED EMBODIMENT

Figure 1:
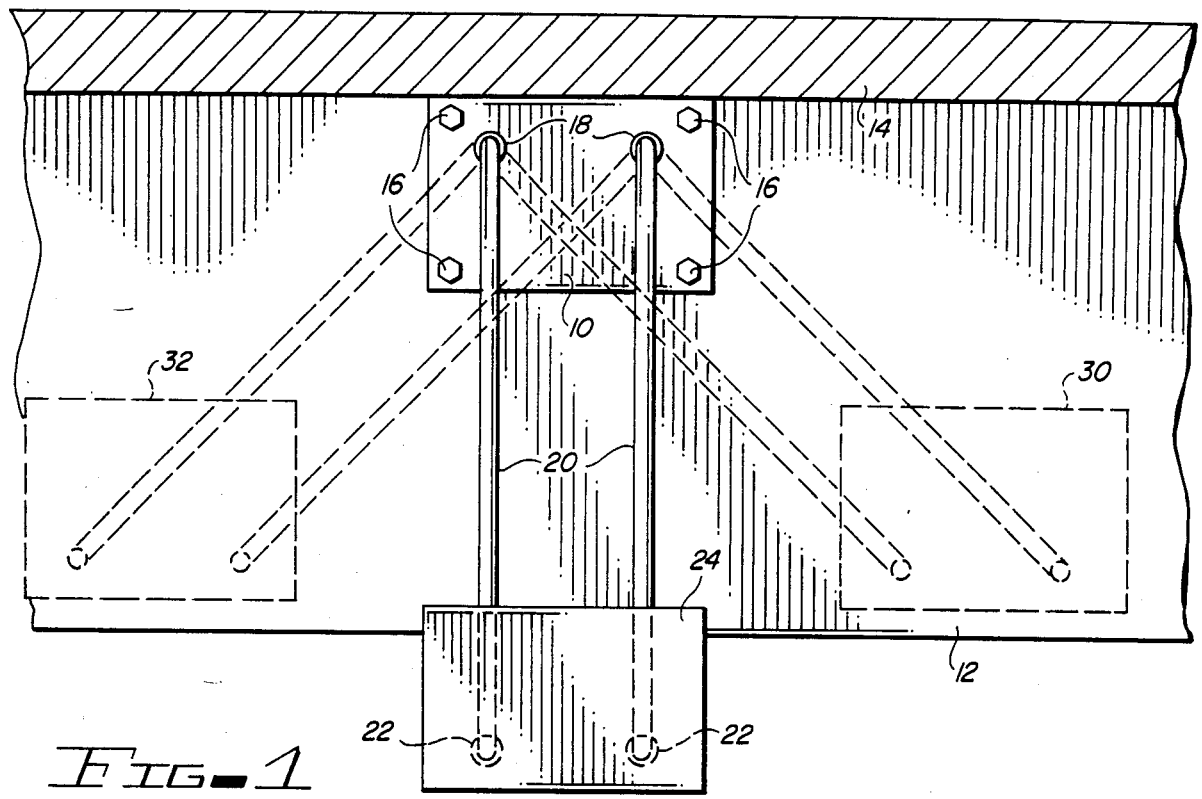
FIGS. 1 and 2 are top and side views of the inventive swivel mount support apparatus of the present invention operatively coupled to a workbench.
Figure 2:
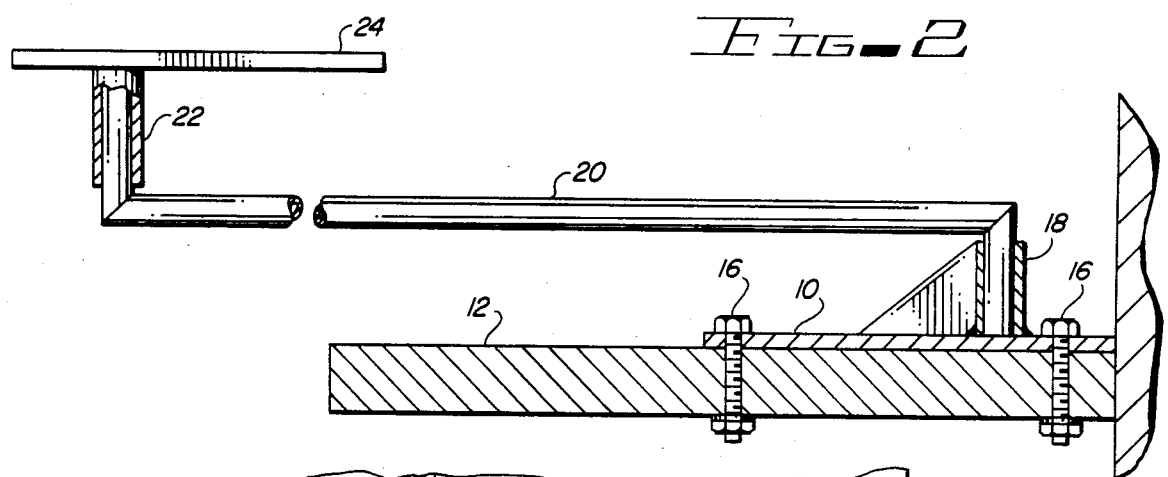
Figure 3:
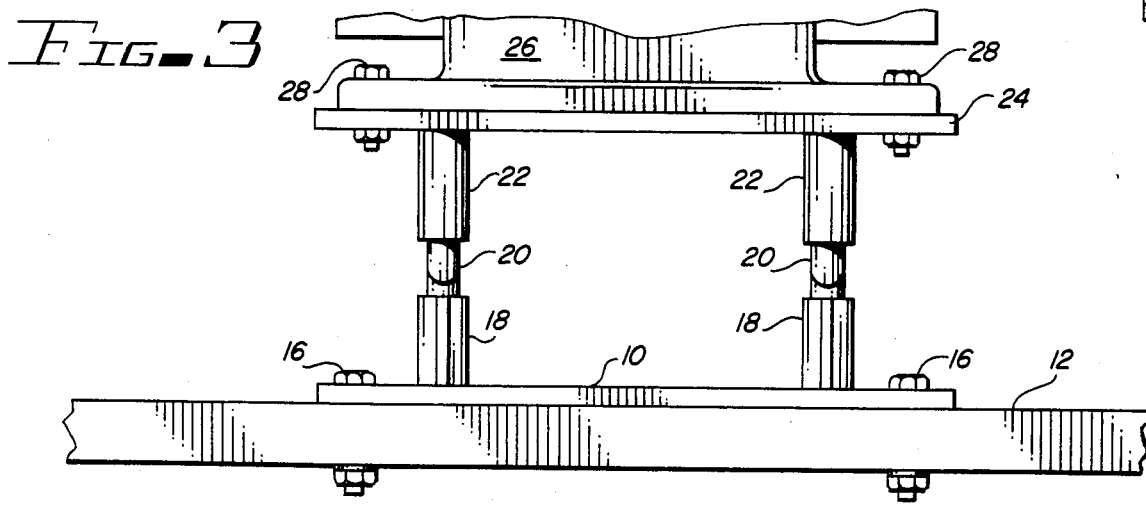
FIG. 3 is a front view of the inventive swivel mount support apparatus of the present invention operatively coupled to a work bench and having a bench grinder mounted thereon.

FIGS. 1, 2, and 3 are top, side and front views of the swivel mount support apparatus of the present invention. As can be seen, a base plate 10 is secured to the rear portion of a workbench 12 adjacent wall 14 by a conventional nut and bolt assemblies 16 or the like. Base plate or mounting plate 10 may be for example, approximately 11" wide, 8" deep, and $\frac{1}{8}$" in thickness, and be fabricated of steel or other material which has sufficient strength and durability for the intended purpose. First and second hollow cylindrical vertical pipe sections 18 having an inner diameter of, for example 1" and a length of approximately $2\frac{1}{4}$", are fixedly coupled to the base plate or mounting plate 10 as, for example, by welding or the like. A pair of first and second generally squared off S-shaped pipe member having a substantially straight mid portion 20 each having a length of, for example, 2' and an outer diameter which is slightly smaller than the inner diameter of vertical sections 18 has a first end which is rotatably positioned loosely within one of the first and second vertical sections 18 for pivotable movement therein. The other end of the S-shaped pipe 20 is rotatably positioned in a second pair of hollow cylindrical vertical pipe members 22 which are similar to sections 18 and are fixedly coupled to a support plate 24 as by welding or the like. Thus, each of the S-shaped members 20 as opposite end portions or terminations pivotably mounted within one of the pairs of hollow cylindrical vertical pipe sections or segments 18 and 22. It can be seen from FIG. 3, that a tool such as a bench grinder 26 may be secured on support plate 24 by bolt and nut assemblies 28 or the like. The holes or apertures in support plate 24 may be stamped or drilled to accomodate the particular tool being supported on each mounting plate 24.

Referring now to FIG. 1, it can be seen that the support plate 24 and the tool supported thereon may be swiveled in either direction as indicated by the dotted portions 30 and 32 of FIG. 1. Thus, when the tool supported on plate 24 is not being used, it may be moved against wall 14 and out of the way.

Figure 4A:
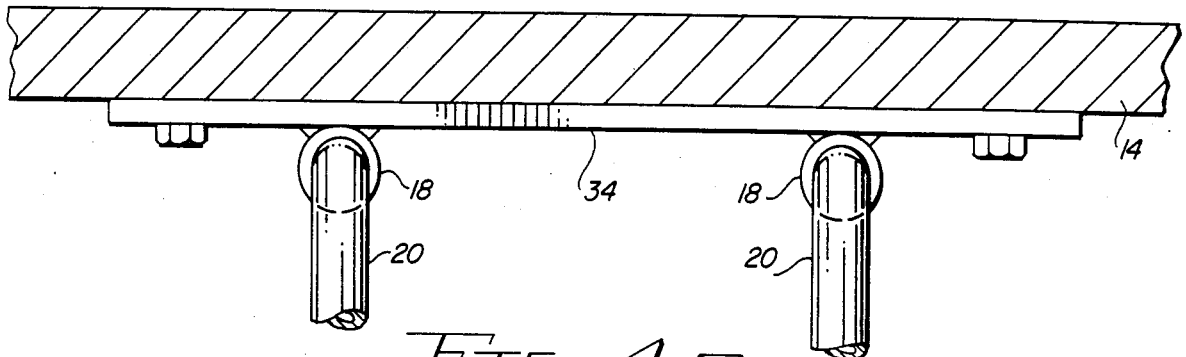
FIGS. 4A, 4B, and 4C are front, side and top views of a mounting plate arrangement for mounting the inventive swivel mount support apparatus of the present invention on a vertical wall.
Figure 4B:
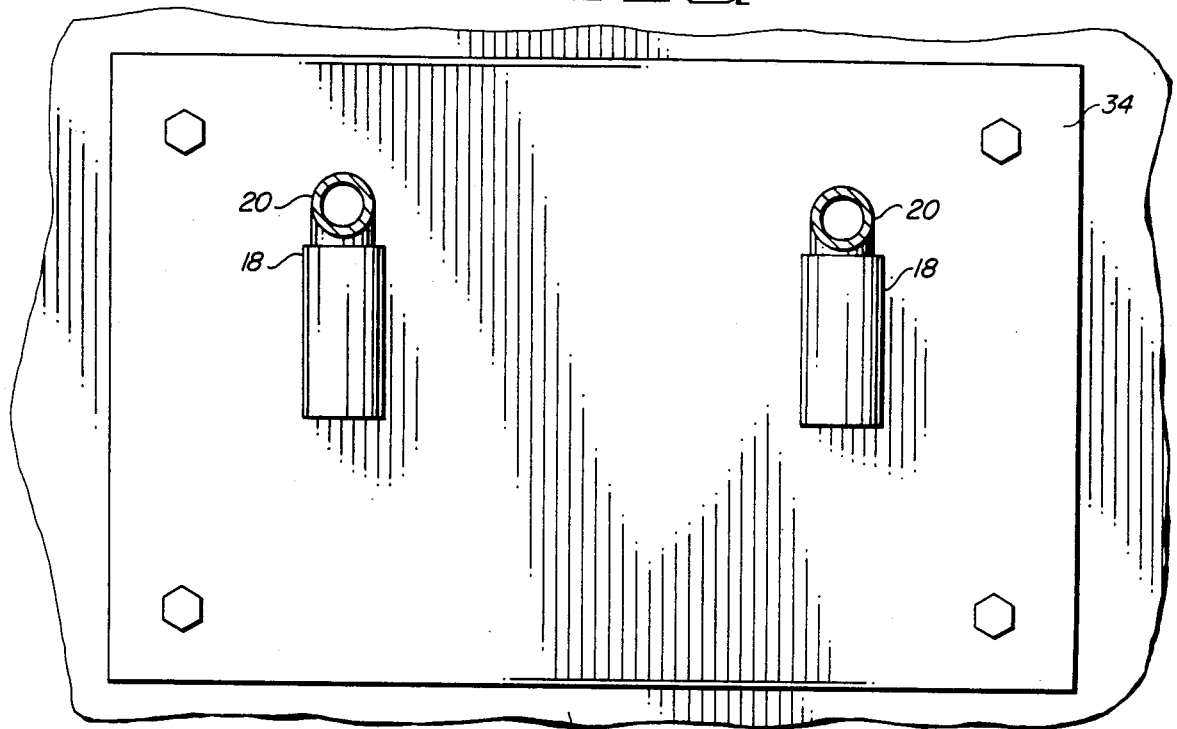
Figure 4C:
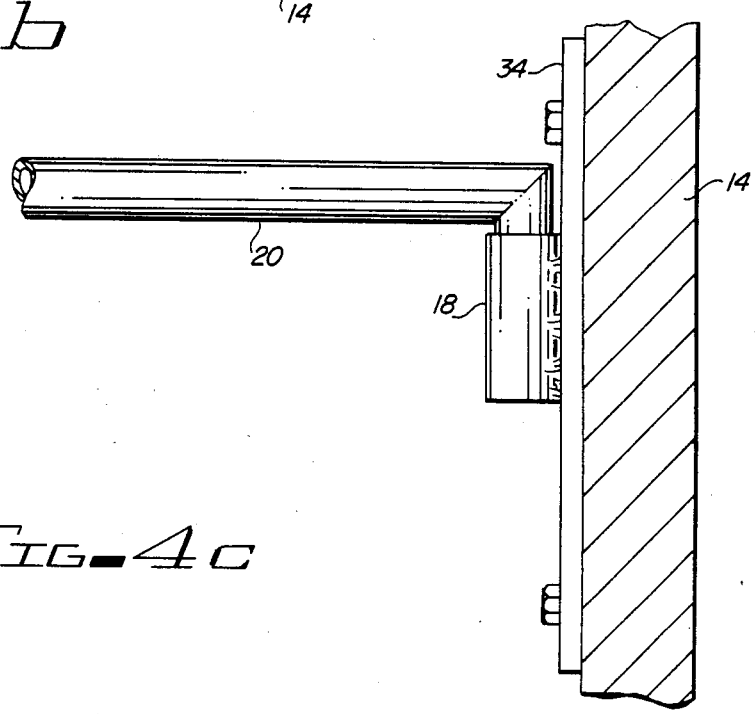

FIGS. 4A, 4B, and 4C are front, side and top views of a mounting plate 34 for mounting the swivel mount support apparatus 24 to a vertical wall. As can be seen, vertical pipe sections or segments 18 into which opposite end portions or terminations of a pair of S-shaped members 20 having substantially straight elongated mid portions are positioned and the substantially vertical pipe sections or segments 18 are fixedly coupled as by welding or the like to a mounting plate 34 which may, in turn, be bolted or otherwise secured to wall 14. The pair of S-shaped members 20 are not physically connected to the pipe segments 18 but are simply inserted therein for pivotal rotation. Both opposite end portions of the S-shaped members 20 are free to rotate with the restriction being that the pair of S-shaped members 20 always remain parallel to one another.

The above description is given by way of example only. Changes in form and details may be made by one skilled in the art without departing from the spirit and scope of the present invention which is limited only by the appended claims.

What is claimed is:

1. A swivel mount support apparatus for use with a support table, comprising:

a relatively flat rigid mounting plate being centrally disposed at one edge of said support table, said mounting plate being substantially horizontal;

first and second hollow cylindrical coupling members fixedly coupled to said mounting plate and each including a hollow cylindrical body portion having a first inside diameter, one open end being operatively secured to said relatively flat mounting plate for closing off said one open end and such that the opposite open end is disposed substantially vertically upward, said first and second hollow cylindrical coupling members being spaced a given distance apart on said mounting plate;

a support plate having a flat, planar surface, said support plate being operably disposed at a higher elevation than said mounting plate and being substantially parallel to said mounting plate;

means for securing said mounting plate to an upper horizontal surface of said support table and means for securing said support plate to a power tool or the like;

third and fourth hollow cylindrical coupling members fixedly coupled to the underside of said support plate and each including a hollow cylindrical body portion having a first inside diameter, one open end thereof being operatively secured to said relatively flat mounting plate for closing off said one open end such that the opposite open end is operatively disposed substantially vertically downward, said third and fourth hollow cylindrical coupling members being spaced said given distance apart on said support plate; and only first and second elongated S-shaped members substantially parallel to each other and each having a relatively straight elongated horizontal mid-portion having a length exceeding said given distance and extending beyond another edge of said support table opposite said one edge of said support table, and opposite end portions at the extremities of said mid portion, both end portions of each of said first and second elongated S-shaped members having an outside diameter dimensioned for being operatively and removably rotatably received with the hollow cylindrical body portion of said coupling members through the opposite openings thereof for pivotally rotating thereon and the distal end portion of each of said end portions being operably disposed through said hollow cylindrical body portion for abutting the underlying plate surface and rotating thereon, each of said end portions extending in a vertical direction, said first S-shaped member having one end portion removably and rotatably coupled within the hollow cylindrical body portion of said first hollow cylindrical coupling member through the opposite vertically upwardly disposed opening thereof for pivotally rotating therein and having its opposite end portion removably and rotatably insertably received within the hollow cylindrical body portion of said third coupling member through said opposite vertically downwardly disposed opening thereof for pivotal rotating therein, said second elongated generally S-shaped member having one end portion removably and rotatably coupled within the hollow central body portion of said second hollow cylindrical coupling member through said opposite vertically disposed opening thereof for pivotal rotation therein and having its opposite end portion removably and rotatably inserted within the hollow cylindrical body portion of said fourth coupling member through the opposite vertically downwardly disposed opening thereof for pivotally rotating therein, said hollow cylindrical coupling members being operably disposed on said mounting plate and on said support plate such that both of the relatively straight elongated mid portions of said S-shaped members are substantially parallel to one another at all times, said end portions removably, slidably and pivotally engaging said hollow coupling members without actual physical means for retaining said end portions in order to allow said end portions to be easily removed from said hollow cylindrical coupling members.

2. The swivel mount support apparatus of claim 1 wherein said hollow cylindrical coupling members include first, second, third, and fourth pipe sections, said first and second pipe sections being butt-welded to the relatively flat, horizontal upper surface of said mounting plate for closing one end of the bottom of each of said first and second pipe sections with the upper surface of the mounting plate so that the opposite open end of each of said first and second pipe sections is substantially vertically upwardly disposed, said first and second pipe sections being spaced said given distance apart and said third and fourth pipe sections being butt-welded to the bottom surface of said relatively horizontal substantially flat support plate for closing the first end of each of said third and fourth pipe sections against the bottom surface of said support plate so that the opposite open end of each of said third and fourth pipe sections is substantially vertically downwardly disposed and the axes of said downwardly disposed end portions of said third and fourth pipe sections is substantially parallel to but non-coaxial with the axes of said upwardly disposed opened end portions of said first and second pipe sections, the first substantially vertically downwardly disposed end portion of said first S-shaped member being operatively rotatably received within the open hollow portion of said first pipe section for rotation therein and the opposite generally vertically upwardly disposed end portion of said first S-shaped member being operatively rotatably received within the open hollow interior of said third pipe section at the bottom of said support plate for pivotal rotation therein, said first generally vertically downwardly disposed end portion of said second S-shaped member being operatively rotatably received into the hollow end portion of said second pipe section for pivotal rotation therein and the opposite generally vertically upwardly disposed end portion of said second S-shaped member being operatively rotatably received within the hollow interior of said fourth pipe section of pivotal rotation therein, the pivotal rotation of said support plate with respect to said mounting plate being such that the elongated midportions of each of the first and second S-shaped members always remain substantially parallel to one another.

3. A swivel mount support apparatus comprising:
a substantially rigid fixed mounting plate having first and second surface portions adapted to receive, respectively, first and second pivot cylinders;
a substantially horizontal rigid moveable support plate having downward facing third and fourth surface portions adapted to receive, respectively, third and fourth pivot cylinders, wherein said third and fourth surface portions are operably disposed at a higher elevation than said first and second surface portions;

first and second smooth bore hollow pivot cylinders vertically oriented and fixed in a parallel fashion, respectively, to said first and second surface portions of said mounting plate, and located a predetermined distance apart and having first and second upward pointing open ends;

third and fourth smooth bore hollow pivot cylinders vertically oriented and fixed in a parallel fashion, respectively, to said third and fourth surface portions of said support plate, and located said predetermined distance apart and having third and fourth downward pointing open ends;

only first and second arms, each having a central portion and parallel end portions, wherein said end portions are disposed at each end of said central portion and of a size and shape to slide into said pivot cylinders and rotate freely therein, wherein said central portions are of substantially equal length exceeding said predetermined distance and are substantially horizontally arranged, wherein a first end portion of each arm is substantially vertically downwardly oriented and a second end portion of each arm is substantially vertically upwardly oriented; and wherein downwardly oriented end portions of said arms are inserted in said upward pointing open ends of said first and second pivot cylinders and upwardly oriented end portions of said arms are inserted in said downward pointing open ends of said third and fourth pivot cylinders so that said arms are moveably parallel.

4. The support apparatus of claim 3 wherein said first and second surface regions of said mounting plate are approximately vertically oriented and said first and second pivot cylinders are fixed by their sides to, respectively, said first and second surface regions of said mounting plate, and said third and fourth pivot cylinders are fixed by ends opposite said open ends to, respectively, said third and fourth surface regions of said support plate.

5. The support apparatus of claim 3 wherein said mounting plate is horizontally oriented and said first and second pivot cylinders are but-welded by ends opposite their open ends to, respectively, said first and second surface portions of said mounting plate and said third and fourth pivot cylinders are but-welded by ends opposite their open ends to, respectively, said third and fourth surface portions of said support plate.

* * * * *